Aug. 18, 1942.    W. T. KENWORTHY    2,293,467
TIRE TOOL
Filed Oct. 10, 1940    2 Sheets-Sheet 1

INVENTOR.
Willard T. Kenworthy
BY
Barnes, Kisselle, Laughlin & Rausch
ATTORNEY.

Aug. 18, 1942.   W. T. KENWORTHY   2,293,467
TIRE TOOL
Filed Oct. 10, 1940   2 Sheets-Sheet 2
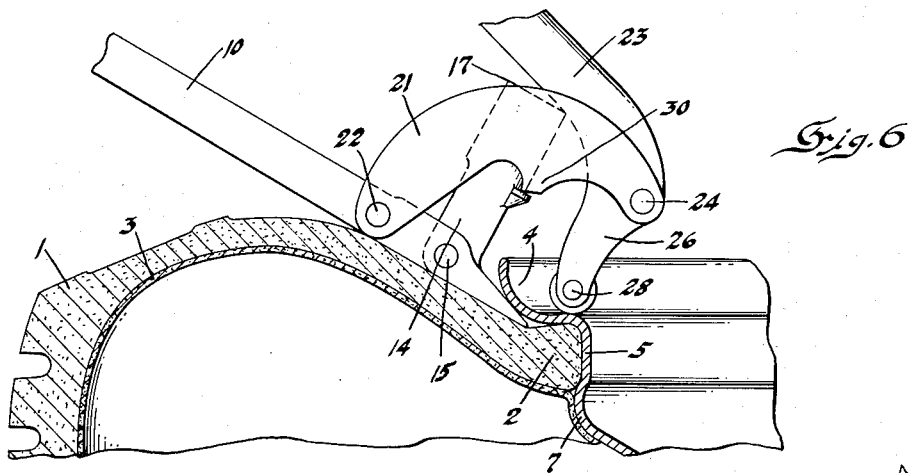
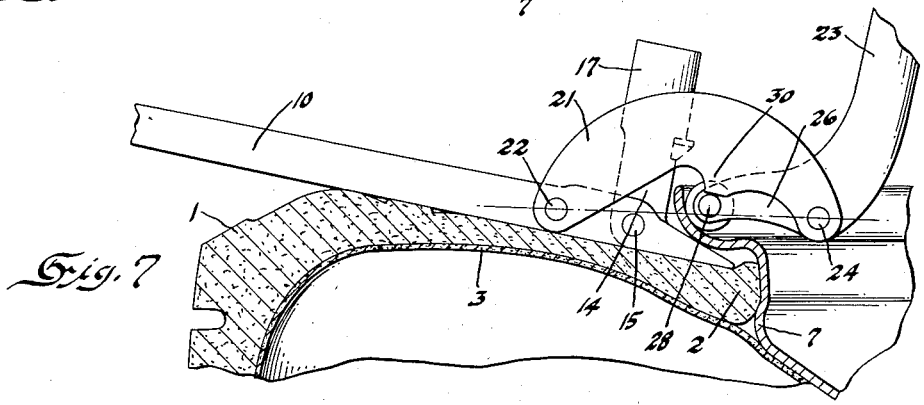
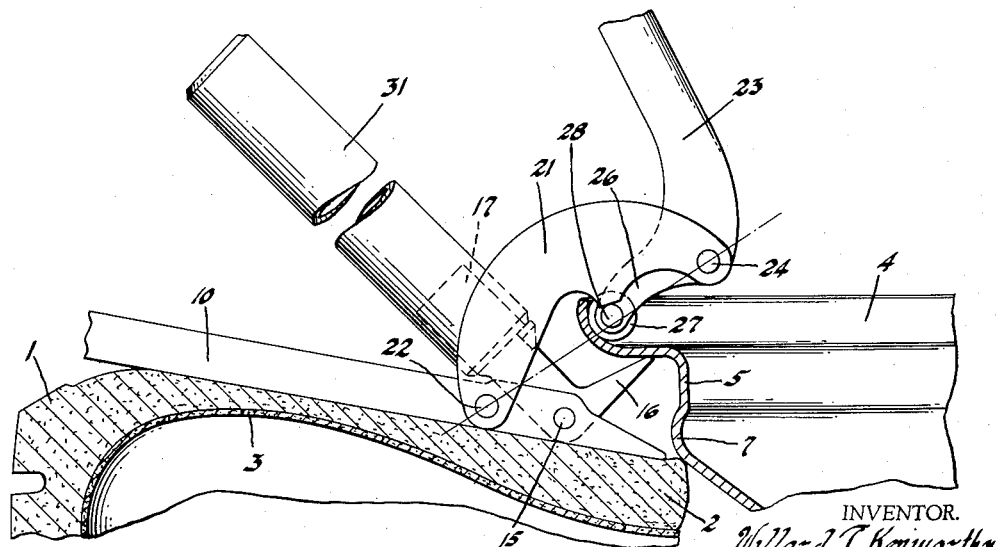
INVENTOR.
Willard T. Kenworthy
BY
Barnes, Kisselle, Laughlin & Raisch
ATTORNEY.

Patented Aug. 18, 1942

2,293,467

UNITED STATES PATENT OFFICE 2,293,467

TIRE TOOL

Willard T. Kenworthy, Detroit, Mich., assignor to Miller Tool & Manufacturing Company, Detroit, Mich., a corporation of Michigan Application October 10, 1940, Serial No. 360,531

6 Claims. (Cl. 157—6)

This invention relates to a tire tool for use in removing pneumatic tires from rims.

The so-called drop center rim has been used extensively in recent years for pneumatic tires on automotive vehicles. The drop center rim has a groove in its central portion so that the central portion has a smaller diameter than the remaining parts of the rim. In order to mount a tire on the rim or to remove a tire from the rim, the tire beads at one location are located in the groove so that the rim and tire are eccentric relative to each other, and then that portion of the tire diametrically opposite the portion in the groove may be slipped on to or from the rim. One difficulty with a rim of this type is that when a tire is punctured or blows out while the vehicle is operating, the tire beads shift into the drop center portion and the tire is liable to be thrown from the wheel. This is particularly true at high speeds, and is a dangerous thing. To meet this situation, drop center rims have been recently designed with a circumferential ridge or hump between the drop center portion and the parts upon which the beads of the tire rest. The arrangement is designed to prevent throwing the tire when it is punctured or blown out in use.

This construction, however, increases the difficulty of removing a deflated tire from the rim because the tire bead must be passed over the circumferential ridge or hump before the portions of the bead can be placed in the drop center part of the rim. Thus the rim construction which is designed to increase the safety factor, increases the difficulty of removing the tire from the rim for service work or for replacement purposes.

The object of the present invention is to provide a tool for shifting the bead of a tire across the safety ridge or hump so that the same can be removed from the rim. The tool may find use in rims not provided with the safety ridge or hump, or in other words, with the previously used drop center rings, although its greatest value is in connection with the new safety rims.

The accompanying drawings show a tool constructed in accordance with the invention and also illustrates the tire and rim section with which the tool is most useful.

Fig. 1 is a cross sectional view taken through a pneumatic tire and drop center rim of the safety type mentioned herein.

Fig. 2 is a side elevational view of the tool.
Fig. 3 is an end view thereof.
Fig. 4 is a top plan view.

Fig. 6 is a view illustrating the first step in the application of the tool to the rim.

Fig. 7 is a view illustrating the tool applied to the rim.

Fig. 8 is a view illustrating how the bead of the tire has been forced across the safety ridge of the rim.

Figure 1:
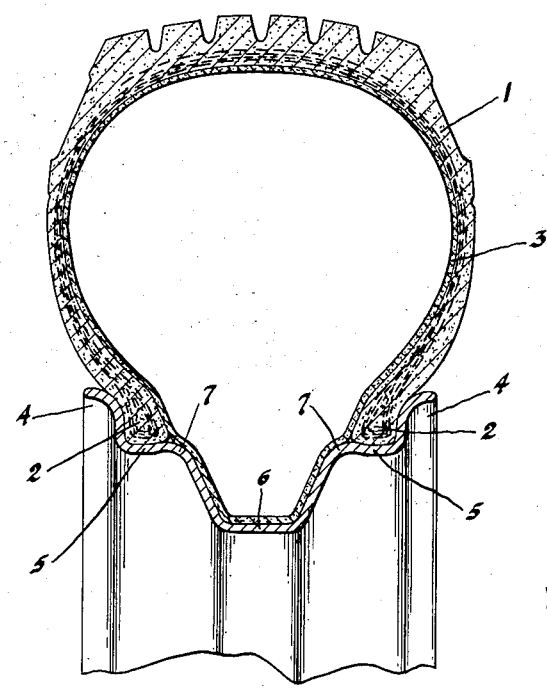
Figure 3:
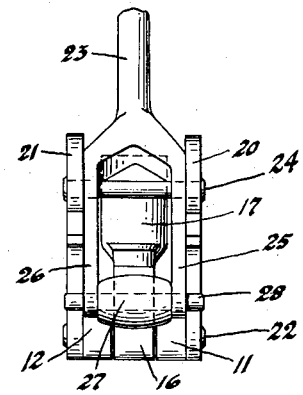
Figure 4:
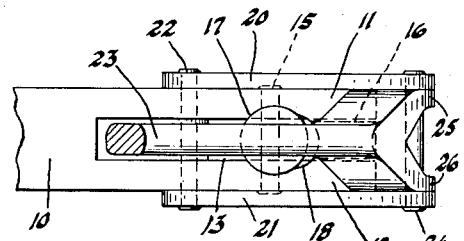

In Fig. 1 the casing of a pneumatic tire is illustrated at 1 provided with bead portions 2 which are substantially non-stretchable in the sense that they seat upon the rim against the pressure in the tire. The inner tube is shown at 3. The rim has the usual side flanges 4 inwardly of which are circumferential seats 5 upon which the beads of the tire seat, and the central portion has a drop center section 6. The new rim in question has a relatively small circumferential ridge or hump between each seat 5 and the drop center section 6 as illustrated at 7. When the tire is punctured or blown out these circumferential ridges are designed to prevent the beads from shifting into the drop center sections and thus prevent throwing the tire from the wheel. By the same token it is extremely difficult to remove a deflated tire from the rim because of the necessity of shifting the inflexible beads 2 across the circumferential humps so that they may be placed in the drop center section.

Figure 2:
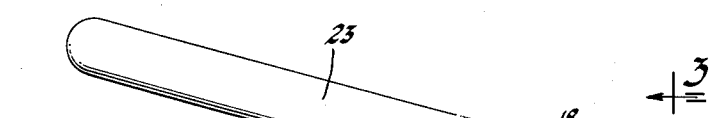
Figure 2:
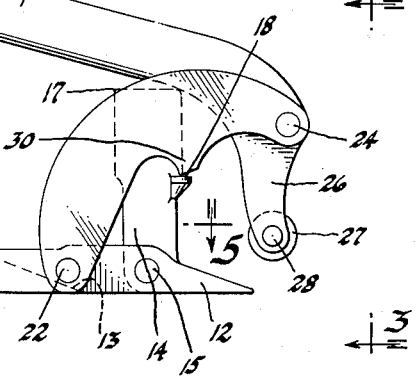

The tool comprises a body comprising a bar of suitable metal 10 bifurcated at one end, thus forming spaced fingers 11 and 12, the bifurcation or slot being illustrated at 13. The fingers 11 and 12 are formed so as to taper to relatively sharp ends as illustrated in Fig. 2.

A relatively movable element 14, somewhat in the form of a bell crank, is pivotally mounted between the fingers 11 and 12 as by means of a pin 15. This element has a finger 16, the contour of which is substantially the same as the fingers 11 and 12, so that when the finger 16 is placed in alignment therewith it coincides therewith as shown in Fig. 2, and forms a wedge-like shape. The member 14 has a head 17 and a stop 18 adapted to receive a suitable handle which may be in the form of a tube or pipe arranged to be slipped over the head 17 and to rest upon the stop 18.

Two links 20 and 21 are pivotally mounted to the body bar 10 as at 22, while a lever 23 is pivotally mounted between the opposite ends of the links as shown at 24. This lever is arranged to provide a handle portion as indicated on one side of the pivot 24 while the lever is bifurcated and has two arms 25 and 26, between the ends of which is a pivotally mounted roller 27. This roller has its surfaces of convex form so as to substantially fit the curvature of the rim as will presently appear. The roller may be mounted between the arms 25 and 26 as by means of a pin 28.

Figure 5:
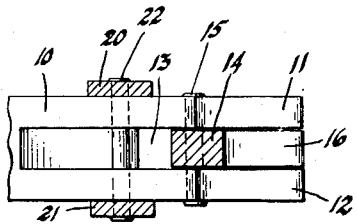
Fig. 5 is a sectional view taken on line 5—5 of Fig. 2.

The use of the tool is illustrated in Figs. 5, 6 and 7 and the description of such use is as follows: The wedge-like formation including the fingers 11, 12 and 16, are urged by the operator into a position between the side wall of the tire and one of the side flanges 4 as shown in Fig. 6. At this time the member 14 is substantially in the position shown so that the finger 16 is in alignment with the fingers 11 and 12. The lever 23 is positioned so that the roller 27 is in a position to engage the opposite side of the flange 4. The operator now applies one hand to the body 10 and the other to the lever 23, and by pushing downwardly on the body 10 to slightly compress the side wall of the casing, and by swinging the lever 23 clockwise as Fig. 6 is viewed the tool is clamped to the flange 4. In this action the wedge formation is drawn in between the bead of the tire and the flange 4. The roller 27 has its convex formation so that no sharp edges are applied to the rim which might otherwise objectionably deface or cut the finished surface of the rim. The ends of the pin 28 project, as illustrated, and the links 20 and 21 are so shaped as to strike the pin and thus limit the relative movement of the parts as the tool is applied. To this end, the links have portions 30 which engage opposite ends of the pin 28.

With the tool thus applied, the center of the pivot for the roller 27 is moved beyond a line connecting the centers of the link pivots 22 and 24 as illustrated by the center line shown in Figs. 7 and 8. Thus the tool holds itself in position, and once applied need not be further held by the operator. A suitable handle 31, such as a section of pipe, or any other handle designed to fit on the head 17, is now applied to the head and is swung to pivot the element 14 from the position shown in Fig. 7 to the position shown in Fig. 8. The finger 16 thus engages the inside of the flange 4; and the finger 16 on the one hand and fingers 11 and 12 on the other spread apart by a pivotal action, with the result that the body of the tool, including its fingers 11 and 12, shifts the bead of the tire forceably across the safety ridge.

After the bead on one side of the tire has been once moved across the ridge, the tire is reversed and the bead on the other side is similarly shifted across the safety ridge, whereupon the bead at these locations may be shifted into the drop center, and the casing at substantially the diametrically opposite location can be moved off the rim.

The tool may not be used in replacing a casing on the rim. The replacing of a tire on the rim may be carried out substantially as follows: the tire is applied to the rim in the usual manner and the tube slowly inflated. When the tube and tire seem to be in the proper position, one continues to inflate the tube until the air pressure is sufficient to cause the beads to snap over the safety ridges, at which time the tire beads go in place on the portions 5 on the rim. After the beads thus snap in place the tire is inflated to the desired air pressure.

I claim:

1. A tool for use in removing the casing of a pneumatic tire from a drop center rim which has a ridge between the drop center portion and the portion upon which the casing bead seats comprising, a body member having a bifurcated end with the fingers thereof of wedge formation, another member pivoted to the body member having a finger of wedge formation positioned between the fingers on the body, the fingers being adapted to be aligned and inserted between the casing and a flange of the rim, a pair of links on the body member, a lever pivoted to the links, means on the lever for engaging the outside of the flange of the rim, said lever being arranged to be swung so that the flange engaging means moves past the center line between the pivotal connections of the links with the body member and lever, said other member being adapted to be swung on its pivot to cause its fingers to separate the flange and casing and move the bead of the casing past said ridge.

2. A tool for use in removing the casing of a pneumatic tire from a drop center rim which has a ridge between the drop center portion and the portion upon which the casing bead seats comprising, a body member having a bifurcated end with the fingers thereof of wedge formation, another member pivoted to the body member having a finger of wedge formation positioned between the fingers on the body, the fingers being adapted to be aligned and inserted between the casing and a flange of the rim, a pair of links on the body member, a lever pivoted to the links, a roller on the lever for engaging the outer surface of the flange, said lever being shiftable so that the flange is clamped between said fingers and the roller with the axis of the roller positioned past the center line through the pivotal connections with the links of the body member and lever, said other member being rockable to cause the said fingers to engage the tire and rim and separate them to thereby shift the bead of the casing past said ridge.

3. A tool substantially for the purpose described comprising, a body member having a bifurcated end with wedge-like fingers, a member pivotally mounted in the bifurcated formation and having a wedge-like finger, a pair of links pivoted to the body member, a lever pivoted between the links, a roller carried by the lever, the arrangement being such that a flange of the rim may be clamped between the wedge-like fingers and the roller, the said member being operable on its pivot relative to the body member to cause a separation of the ends of the fingers on the body member relative to the end of the fingers on the said member.

4. A tool substantially for the purpose described comprising two members pivoted together and having wedge-like fingers adapted to be inserted between a pneumatic tire casing and a flange of a rim, links pivoted to one member, a lever pivoted to the links, means on the lever for engaging the outside of the flange of the rim upon movement of the lever, means for limiting the movement of the lever in the application of the tool to the flange of the rim in a position where the flange-engaging means on the lever has moved past a line through the pivot centers of the links, the member being relatively shiftable to cause the fingers to shift the bead of the tire casing away from the flange of the rim.

5. A tool substantially for the purpose described comprising, a body member having a finger, a member pivoted to the body member and having a similar finger, the fingers adapted to be aligned and inserted between a pneumatic tire casing and a flange of a rim, a link on the body member, a lever pivoted to the link, means on the lever for engaging the outside of the flange of the rim, said lever arranged to be swung so that the flange-engaging means moves past the center line between the pivotal connections of the link with the body member and lever, the pivoted member adapted to be swung on its pivot to cause the fingers to shift the bead of the tire casing away from the flange of the rim.

6. A tool substantially for the purpose described comprising, a body member having a finger, a second member movably connected to the body member and having a finger, the fingers being adapted to be aligned and inserted between the casing of a pneumatic tire and a flange of a rim, a link pivoted on the body member, a lever pivoted to the link, means on the lever for engaging the outside of the flange of the rim, said lever arranged to be swung so that the flange-engaging means moves past the center line between the pivotal connections of the link with the body member and lever, whereby the tool retains itself in position as thus applied to the rim, said second member being adapted to be shifted relative to the body member to cause a separation of the fingers, thereby shifting the bead of the tire casing away from the flange of the rim.

WILLARD T. KENWORTHY.